United States Patent
Ediger

(10) Patent No.: US 11,204,232 B2
(45) Date of Patent: Dec. 21, 2021

(54) APPARATUS AND ASSOCIATED METHODS FOR DETECTING A CENTER PLANE OF A MEMBER THROUGH A BARRIER

(71) Applicant: Duane Ediger, Tucson, AZ (US)

(72) Inventor: Duane Ediger, Tucson, AZ (US)

( * ) Notice: Subject to any disclaimer, the term of this patent is extended or adjusted under 35 U.S.C. 154(b) by 235 days.

(21) Appl. No.: 16/741,606

(22) Filed: Jan. 13, 2020

(65) Prior Publication Data

US 2020/0225019 A1  Jul. 16, 2020

Related U.S. Application Data

(60) Provisional application No. 62/791,556, filed on Jan. 11, 2019.

(51) Int. Cl.
| | |
|---|---|
| *G01B 7/004* | (2006.01) |
| *B23Q 17/24* | (2006.01) |
| *G01V 3/08* | (2006.01) |
| *H02S 20/23* | (2014.01) |

(52) U.S. Cl.
CPC ......... *G01B 7/004* (2013.01); *B23Q 17/2428* (2013.01); *G01V 3/08* (2013.01); *H02S 20/23* (2014.12)

(58) Field of Classification Search
CPC .......... G01B 7/004; G01B 7/003; G01B 7/31; B23Q 17/2428; G01V 3/08; H02S 20/23; Y02E 10/50
See application file for complete search history.

(56) References Cited

U.S. PATENT DOCUMENTS

| | | | |
|---|---|---|---|
| 4,329,783 A | 5/1982 | Maresca | |
| 7,758,021 B2 | 7/2010 | Welker | |
| 9,376,817 B2 | 6/2016 | Walker | |
| 2011/0162509 A1* | 7/2011 | Place | G10G 5/005 84/421 |
| 2012/0067019 A1* | 3/2012 | Luking | A01D 34/71 56/320.2 |
| 2015/0301492 A1* | 10/2015 | Ochi | B65H 85/00 271/225 |
| 2017/0053043 A1 | 2/2017 | LaRue et al. | |

* cited by examiner

*Primary Examiner* — Giovanni Astacio-Oquendo
(74) *Attorney, Agent, or Firm* — Polsinelli PC

(57) ABSTRACT

An apparatus is disclosed for identifying a target region along a surface of a barrier corresponding to a plane defined along a member, where the member is occluded from view by nature of the barrier. The apparatus includes a measurement device and a magnet assembly. The magnet assembly generates a magnetic field, and is positioned along a predetermined location of the member over a first side of the barrier. The measurement device is positioned over a second side of the barrier and measures properties of the magnetic field to identify the target region in general alignment with the plane.

16 Claims, 13 Drawing Sheets

APPARATUS AND ASSOCIATED METHODS FOR DETECTING A CENTER PLANE OF A MEMBER THROUGH A BARRIER

CROSS-REFERENCE TO RELATED APPLICATIONS

This application claims the benefit of U.S. Provisional Patent Application No. 62/791,556, filed on Jan. 11, 2019 in its entirety; the contents of the foregoing disclosure being incorporated fully herein by reference.

FIELD

The present disclosure generally relates to construction technologies; and in particular, to an apparatus and associated methods for detection of predetermined location/regions relating to a center plane of a member or other object through a barrier which may be applied for, e.g., rafter center location.

BACKGROUND

Workers in solar energy and other rooftop industries routinely drill multiple holes at each of twenty, forty or more locations in a typical residential solar installation in order to locate the center of the rafters, joists, trusses or similar structural members supporting the roof deck, thereby enabling secure attachment of hardware to the roof by lag screws or other fasteners securely threaded into the center of said structural members. These members are narrow (most commonly 1.5" wide) and can be irregularly spaced. Identifying their location using existing tools and methods is costly, time consuming, and/or prone to cause structural and cosmetic damage. The most commonly used locating method of drilling probing holes is labor-intensive, results in breaking many narrow drill bits and/or weakening structural members precisely where new loads are to be applied, increases vulnerability to roof leaks, and can cause cosmetic damage and needed repairs to living areas marred by test holes and/or sealant overflow. Inaccurate guesswork also results from workers trying to avoid cosmetic damage by not positively locating the edges of exposed rafters. Technically advanced methods such as several involving forward looking infrared radiometry (FLIR) and ultra-wide band radar (UWB) are expensive, inapplicable in commonly found conditions, and/or frequently give false readings.

It is with these observations in mind, among others, that various aspects of the present disclosure were conceived and developed.

BRIEF DESCRIPTION OF THE DRAWINGS

Corresponding reference characters indicate corresponding elements among the view of the drawings. The headings used in the figures do not limit the scope of the claims.

DETAILED DESCRIPTION

Figure 1A:
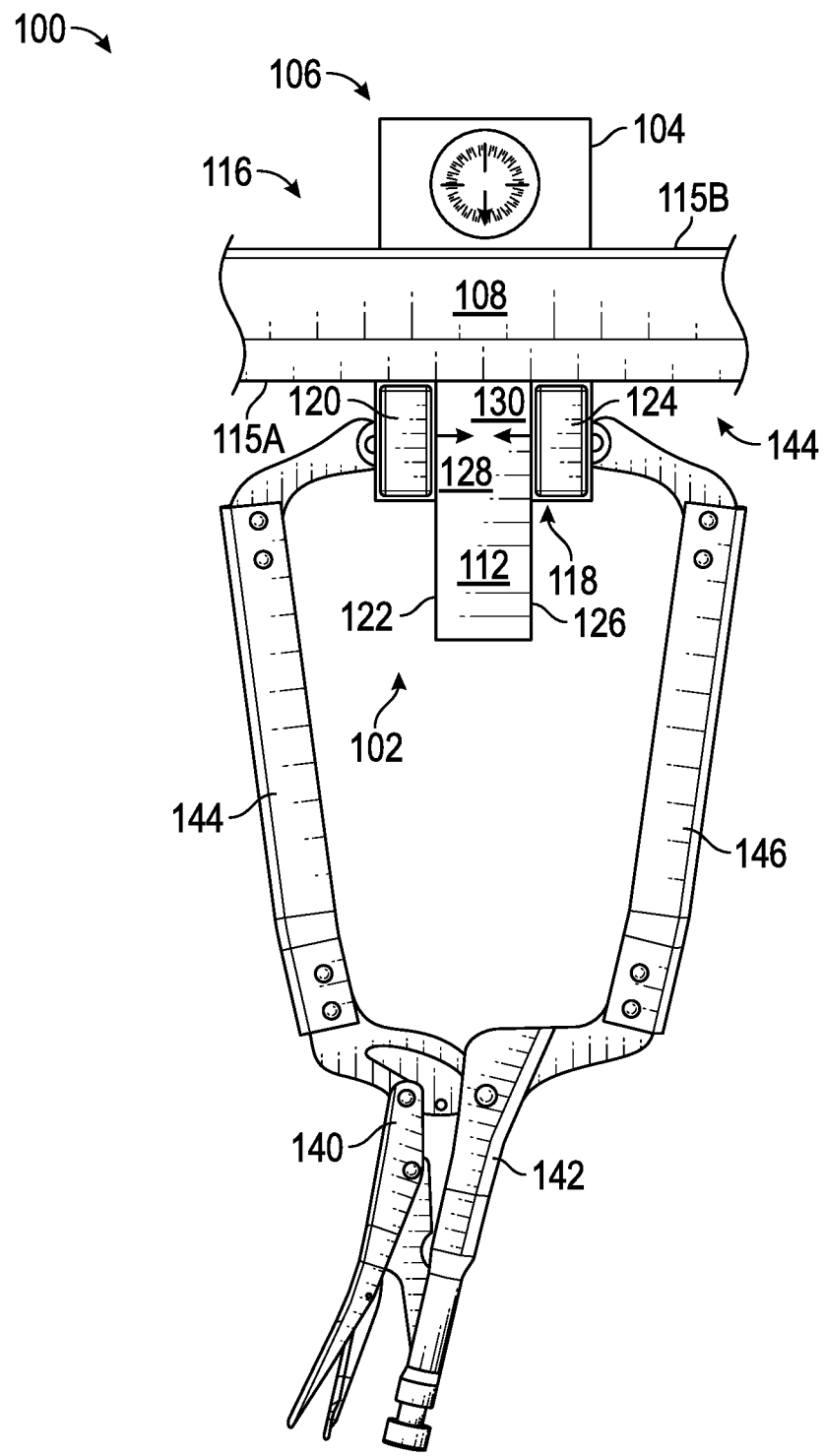
FIG. 1A is a partial view illustrating an embodiment of an apparatus for detecting and/or identifying a center plane of a member; i.e., a plane defined through a center of a member, despite the presence of an occluding barrier (e.g., rafter center location) in situ including a clamp mechanism.

Aspects of the present disclosure relate to an apparatus and associated methods for detecting a target area or region along a barrier (e.g., a roof deck, floor, wall, etc.) corresponding to a plane defined along the center of a member (e.g., a beam, stud, rafter, joist, etc.), where the member is occluded from view by nature of the barrier. For example, employing the apparatus described herein for rafter and roof engagement applications, a target region of a surface of a roof (barrier), corresponding to a center plane along a rafter (member) extending below the roof, may be identified despite the rafter not being visible from the opposite side of the roof. Identifying the target region of the roof surface as described accommodates, e.g., the formation of holes and/or engagement of securing members through the roof along the plane that extends centrally through the rafter.

In some embodiments, the apparatus includes at least a magnet assembly including one or more magnetic blocks that collectively produce a magnetic field. The apparatus further includes a measurement device for measuring the magnetic field of the magnet assembly, which may take the form of a compass, magnetometer, or other such device operable for measuring properties of the magnetic field. In general, the magnet assembly may be aligned along a predetermined position of a member positioned over a first side of a barrier, and the measurement device may be positioned along a second side of the barrier opposite the member, and used to identify a target region along the second side of the barrier corresponding to a plane defined through the center of the member. Specifically, for example, magnetic blocks of the magnet assembly may be positioned symmetrically in relation to the predetermined position of the member to generate a magnetic field. The measurement device measures properties of the magnetic field including the flux direction or force vectors defined by the magnetic field in and throughout the plane (equidistant with respect to the magnetic blocks on each side of the member), and the measurement device can identify force vectors uniquely and consistently parallel to that plane to identify the target region; and can also identify force vectors/flux direction outside the plane; i.e., the flux direction is either non-parallel, or of opposite polarity. In other words, the properties of the magnetic field measurable by the measurement device facilitate identification of the target region of the second side of the barrier (corresponding to the plane of the member).

In some embodiments, each of the first magnetic block and the second magnetic block may include a magnet housing. The magnet housing defines a chamber which is occupied by at least one magnet and may further be occupied by one or more ferromagnetic components. The ferromagnetic components may be strategically placed within the chamber of the magnet housing adjacent to the magnet to effectively amplify the flux density of the magnetic field around the magnet along one side of the magnet housing as desired, as further described herein.

In some embodiments, the apparatus further includes a clamp or other such mechanism for at least temporarily holding the magnetic assembly in place along the predetermined position of the member. Magnetic blocks of the magnet assembly may be rotatably and removably coupled to jaws of the clamp, which may assist to modify properties of the magnetic field, as further described herein. In addition, the clamp may include pressure pad swivel dampers to facilitate orientation and engagement of the magnetic blocks.

Referring to FIG. 1A, an apparatus 100 is shown that includes at least a magnet assembly 102 and a measurement device 104 for identifying a target region 106 along a barrier 108 (e.g., a roof deck, floor, wall, etc.) corresponding to a plane 110 (shown in FIG. 1D and FIG. 3) defined along a center of the member 112 (e.g., a beam, stud, rafter, joist, etc.), where the member 112 is at least partially covered/occluded by the barrier 108. In general, the member 112 is positioned over a first side 114 of the barrier 108 and abuts or is positioned proximate to a first surface 115A of the barrier 108, and the measurement device 104 is positioned over a second side 116 of the barrier 108 along a second surface 115B of the barrier 108. To deploy the apparatus 100, the magnet assembly 102 is positioned along a predetermined location 118 (more clearly shown in FIG. 1D) of the member 112, and the apparatus 100 accommodates identification of the target region 106 defined along some portion of the second surface 115B of the barrier 108 that generally corresponds to the plane 110, as further described herein.

In some embodiments, the magnet assembly 102 includes a first magnetic block 120 positioned along a first lateral side 122 of the member 112, and a second magnetic block 124 positioned along a second lateral side 126 of the member 112 opposite the first lateral side 122, such that the first magnetic block 120 and the second magnetic block 124 are in symmetrical or parallel alignment along the member 112. In this manner, the first magnetic block 120 and the second magnetic block 124 are counter posed, and the first magnetic block 120 defines a first magnetic pole 128 and the second magnetic block 124 defines a second magnetic pole 130 oriented towards the first magnetic pole 128. The convergence of the first magnetic pole 128 and the second magnetic pole 130 produces a magnetic field (302 in FIG. 3A) measurable by the measurement device 104, as further described herein.

Figure 1B:
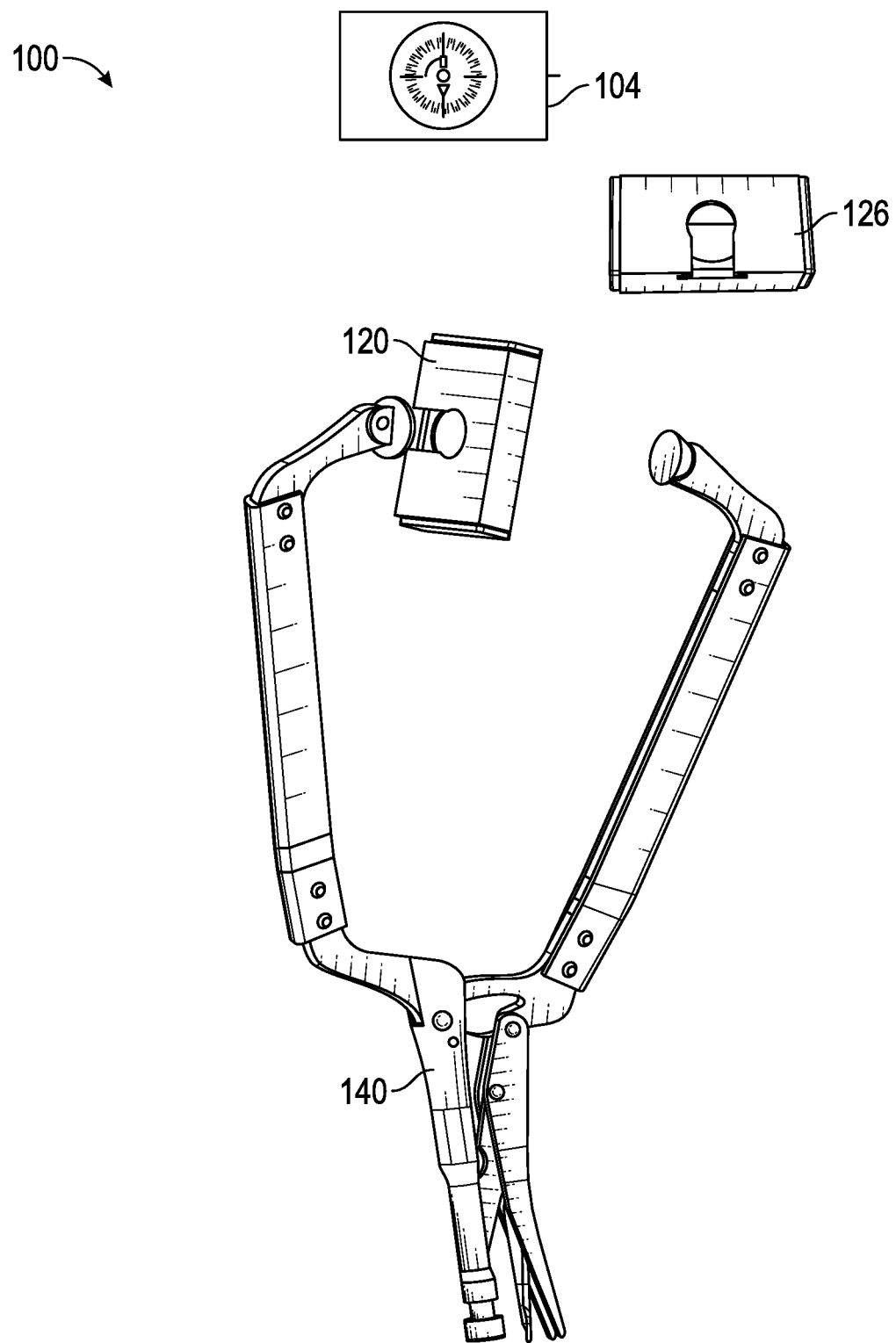
FIG. 1B is an exploded view of the possible components of the apparatus of FIG. 1A.
Figure 1C:
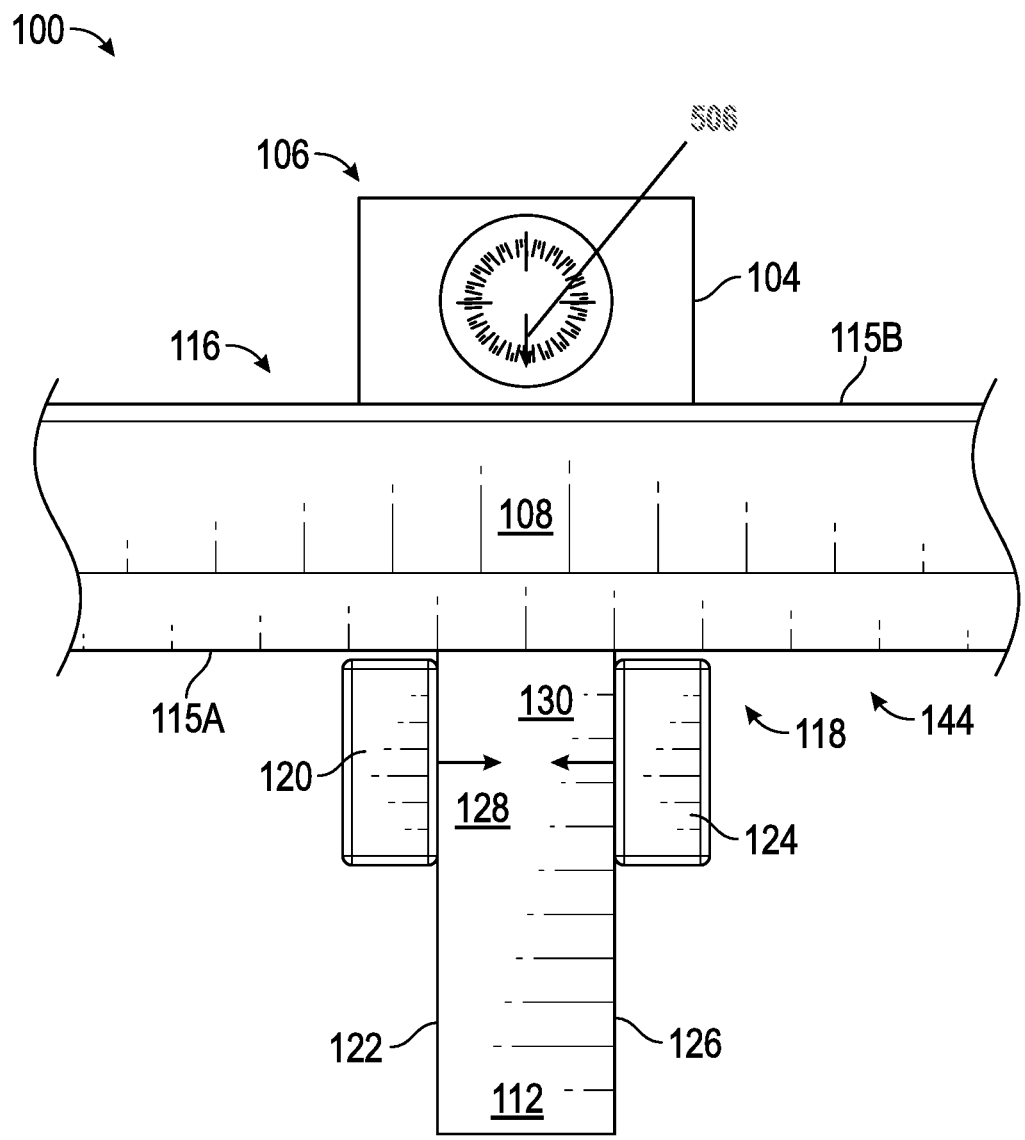
FIG. 1C is a partial view of an embodiment of the apparatus of FIG. 1A devoid of a clamp mechanism, with the measurement device aligned over the center plane of the member.
Figure 1D:
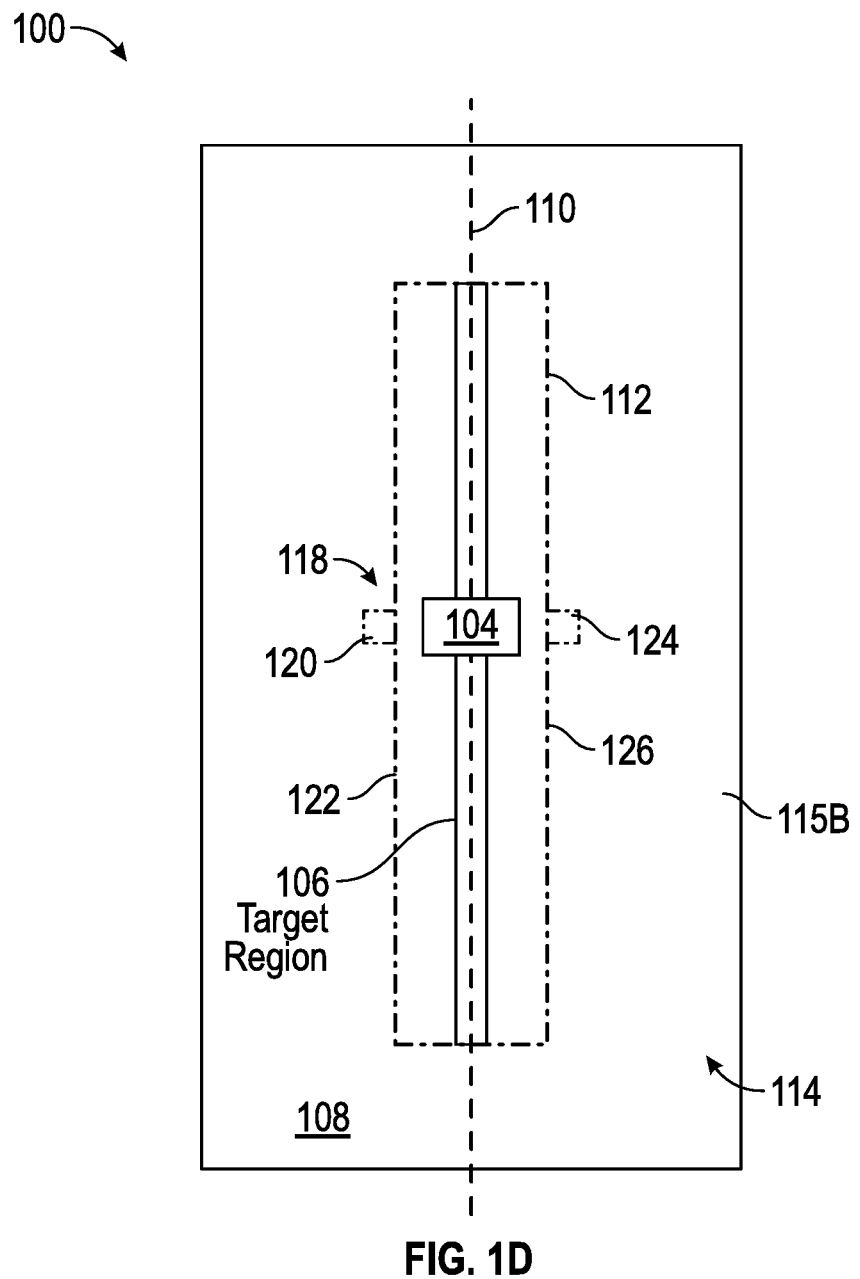
FIG. 1D is a top view of an illustration of the apparatus of FIG. 1A or 1C illustrating the target region in relation to the center plane of the member described herein.
Figure 1E:
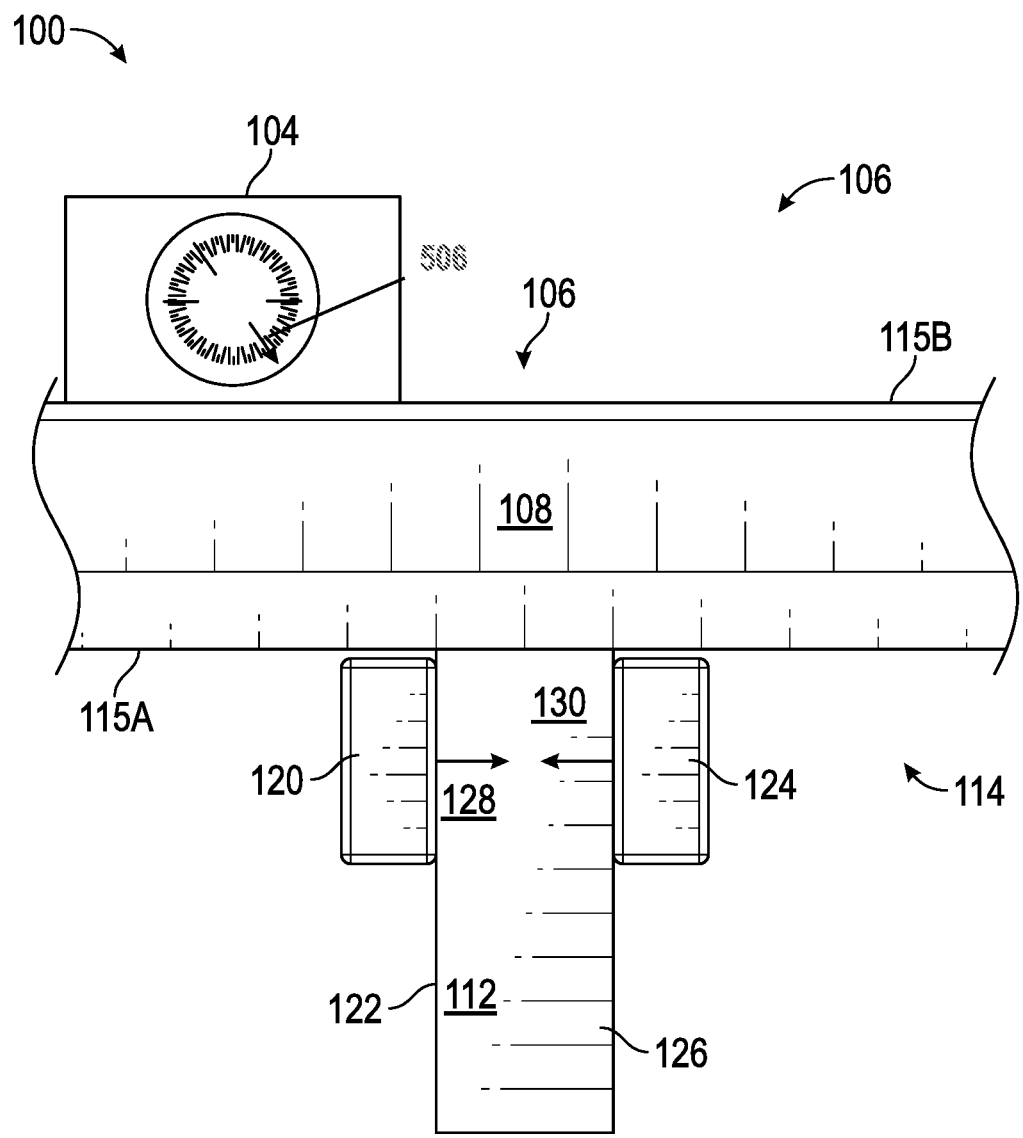
FIG. 1E is a partial view of an embodiment of the apparatus of FIG. 1C devoid of a clamp mechanism showing the measurement device to the left of the center plane.
Figure 1F:
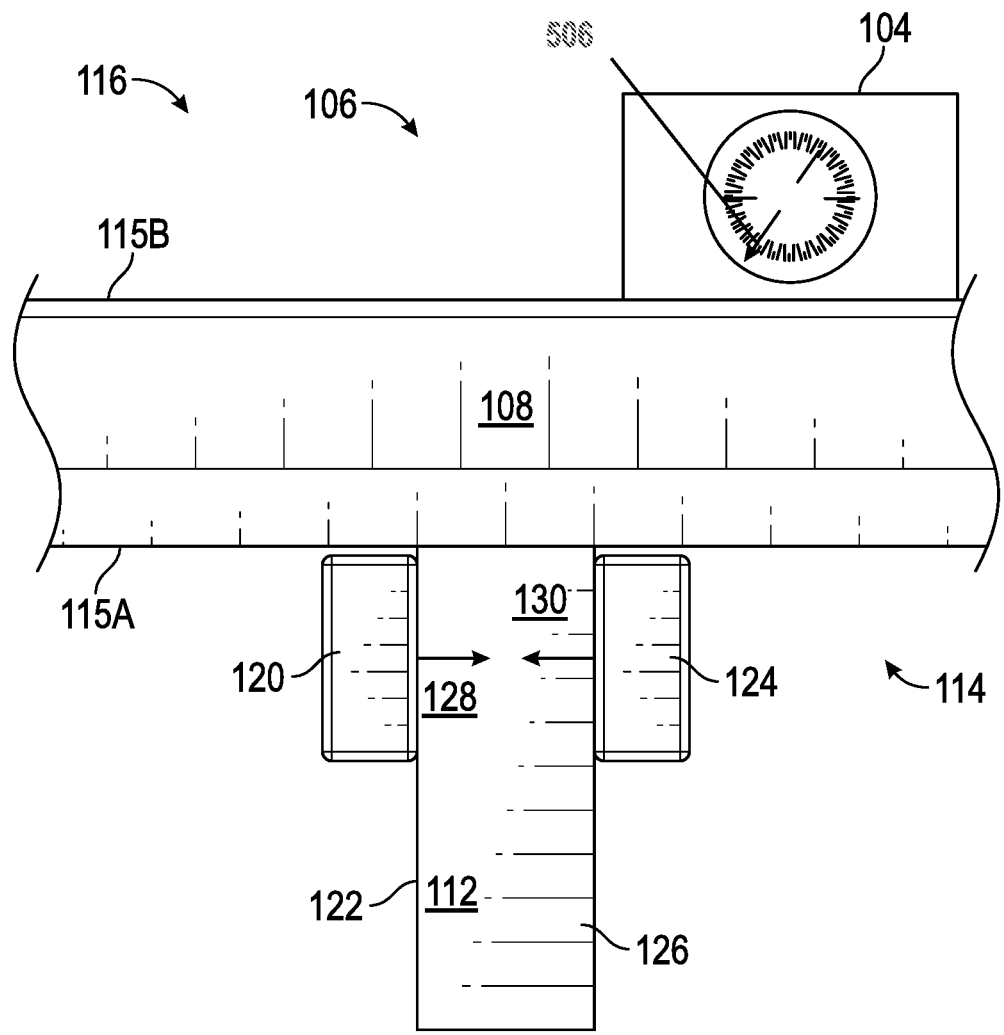
FIG. 1F is a partial view of an embodiment of the apparatus of FIG. 1C devoid of a clamp mechanism showing the measurement device to the right of the center plane.

As shown in FIG. 1A and also in FIG. 1B, the apparatus 100 may include a clamp 140. In general, the clamp 140 includes a base 142, a first jaw 144 extending from the base 142, and a second jaw 146 extending from the base 142 with the second jaw 146 in parallel arrangement relative to the first jaw 144. In general, the first magnetic block 120 of the magnet assembly 102 may be removably coupled to the first jaw 144, the second magnetic block 124 of the magnet assembly 102 may be removably coupled to the second jaw 146, and the clamp 140 may be actuated to position and maintain the first magnetic block 120 and the second magnetic block 124 in the configuration shown in FIG. 1A relative to the member 112. As such, the clamp 140 may be employed to hold the magnet assembly 102 in a fixed position along the predetermined location 118 of the member 112 until the measurement device 104 can be employed to identify the target region 106 along the barrier 108. In other embodiments, as indicated in FIG. 1C, the apparatus 100 is devoid of the clamp 140, and the first magnetic block 120 and the second magnetic block 124 may be positioned in the configuration shown and held in place by way of an adhesive, a securing member (e.g., nails, screws, and the like), a brace, or other such means including, as in the case of a log rafter, by a person's two hands.

Magnet Assembly

Figure 2:
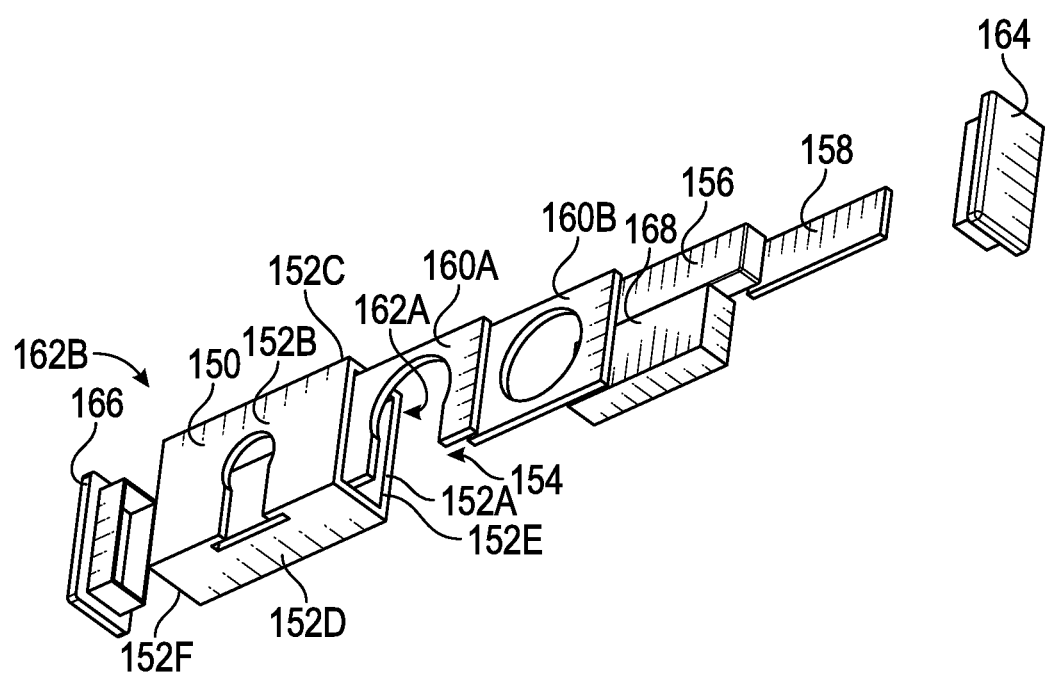
FIG. 2 is an exploded perspective view of an individual magnetic block of FIG. 3 of the magnet assembly described herein including possible components enclosed within the magnetic block.
Figure 3:
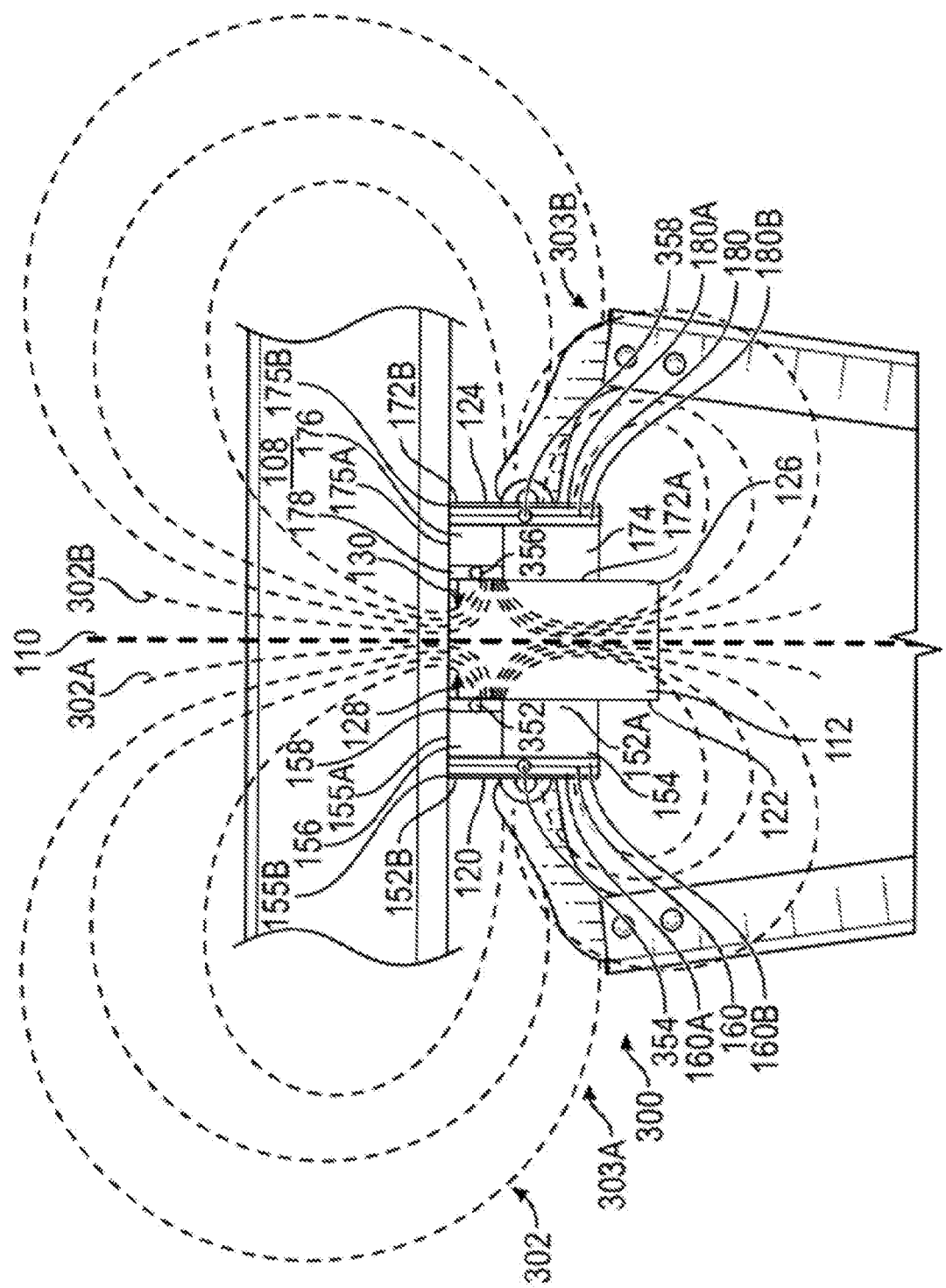
FIG. 3 is an illustration of approximate magnetic flux direction lines utilizing a first configuration of the magnet assembly for identifying a target region corresponding to the plane of the member as described herein.

Referring to a first configuration 300 of the magnet assembly 102 shown in FIG. 3A, and in relation to FIG. 2, enclosed within each of the first magnetic block 120 and the second magnetic block 124 of the magnet assembly 102, a variety of components may be arranged and/or oriented in a manner that modifies or otherwise contributes to the properties of a magnetic field (shown as curved dashed lines as e.g. 302 in FIG. 3) generated. The first magnetic block 120, produces magnetic flux density that contributes to a first portion 303A of the magnetic field 302. Specifically, the first magnetic block 120 may include a magnet housing 150 having a plurality of sides 152 (152A-152F in FIG. 2) collectively defining a chamber 154, and the chamber 154 may define a plurality of quadrants 155 or portions of the chamber 154 referenced herein. As shown, a magnet 156 may be positioned within a first quadrant 155A of the chamber 154 along a first side 152A of the housing 150, and a ferromagnetic component 158 may also be positioned within the first quadrant 155A between the first side 152A of the magnet housing 150 and the magnet 156. In addition, a second ferromagnetic component 160 may occupy a second quadrant 155B of the chamber 154 along a second side 152B of the housing 150 opposite the first side 152A of the housing 150, such that the magnet 156 is positioned between the ferromagnetic component 158 and the second ferromagnetic component 160. In some embodiments shown in FIG. 3, the second ferromagnetic component 160 of the first magnetic block 120 may be comprised of a plurality of individual ferromagnetic components, designated ferromagnetic component 160A and ferromagnetic component 160B.

In some embodiments, the housing 150 (or the housing 170) may further include a pair of openings 162, designated opening 162A and opening 162B in communication with the chamber 154. The opening 162A may be defined along a side 152E of the housing, and the opening 162B may be defined along a side 152F of the housing 150 opposite the side 152E. The opening 162A and the opening 162B accommodate removal and/or repositioning of the components within the housing 150 described herein (e.g., magnet 156). In addition, the housing 150 may include a plug 164 to cover the opening 162A and a plug 166 to cover the opening 162B to fully enclose the chamber 154 during operation. Further still as indicated, the housing 150 may include a filler component 168 such as wood positioned within the chamber 154 to maintain the magnet 156, the ferromagnetic component 158, and the ferromagnetic component 160 in the positions shown.

Similarly, referring to FIG. 3, the second magnetic block 124 may include a magnet housing 170 having a plurality of sides 172 collectively defining a chamber 174, and the chamber 174 may define a number of quadrants 175 relating to portions of the chamber 174, referenced herein. As shown, a magnet 176 may be positioned within a first quadrant 175A of the chamber 174 along a first side 172A of the magnet housing 170, and a ferromagnetic component 178 may also be positioned within the first quadrant 175A between the first side 172A of the magnet housing 170 and the magnet 176. In addition, a second ferromagnetic component 180 may occupy a second quadrant 175B of the chamber 174 along a second side 172B of the housing 170 opposite the first side 172A of the housing 170, such that the magnet 176 is positioned between the ferromagnetic component 178 and the second ferromagnetic component 180. Similar to the first magnet housing 150 of the first magnetic block 120, the second magnetic block 124 produces magnetic flux density that contributes to a second portion 303B of the magnetic field 302. In some embodiments shown in FIG. 3, the second ferromagnetic component 180 of the second magnetic block 124 may be comprised of a plurality of individual ferromagnetic components, designated ferromagnetic component 180A and ferromagnetic component 180B.

As shown in FIG. 3, the first magnetic block 120 and the second magnetic block 124 of the magnet assembly 102 are symmetrically counterposed on opposite lateral sides (122 and 126) of the member 112. The first magnetic block 120 defines a first magnetic pole 128 and the second magnetic block 124 defines a second magnetic pole 130 oriented towards the first magnetic pole 128 of the first magnetic block 120. The convergence of the first magnetic pole 128 and the second magnetic pole 130 generates a magnetic field 302 such that the magnetic field 302 is symmetrical around a center of the member 112.

In some embodiments, the first magnetic pole 128 and the second magnetic pole 130 are of like polarity (e.g., north-north or south-south) such that a repulsive magnetic force is generated between the first magnetic pole 128 and the second magnetic pole 130. The first magnetic block 120 and the second magnetic block 124 may further be of equal strength and thus be equally repulsed away from each other. The equal repulsion created between the first magnetic block 120 and the second magnetic block 124 generates the magnetic field 302 in a manner such that at least one or more force vectors (designated force vector 302A and force vector 302B) of the magnetic field 302 extend in a direction parallel to the plane 110 where the plane 110 is equidistant between the first magnetic block 120 and the second magnetic block 124.

In short, the first magnetic block 120 and the second magnetic block 124 being symmetrically counterposed on opposite sides of the member 112 collectively form the magnetic field 302 such that the magnetic field 302 is symmetrical about the center of the member 112. Once the magnetic field 302 is generated by the configuration 300 of the magnet assembly 102 with the properties described, the measurement device 104 can provide some indication as to the presence of at least one or more force vectors (designated force vector 302A and force vector 302B) extending in a direction aligned with or parallel to the plane 110. As shown and further illustrated in FIG. 1D, positions along the second surface 115B of the barrier 108, where the measurement device 104 detects least one or more force vectors (designated force vector 302A and force vector 302B) extending in a direction aligned with or parallel to the plane 110, may correlate to the target region 106.

In some embodiments, the second ferromagnetic component 160 is greater in mass than the first ferromagnetic component 158 and is placed lateral and adjacent to the magnet 156. The first ferromagnetic component 158 may be placed medial and adjacent to the magnet 156. The placement of magnetically susceptible or ferromagnetic materials adjacent to the magnet 156, effectively amplifies the flux density in a first incident magnetic field (not shown) around the magnet 156. The placement of the first ferromagnetic component 158 and the second ferromagnetic component 160 having unequal masses on each of the two sides of the first magnetic block 120 results in the formation of a magnetic field 302 with higher flux density emanating from the first side 152A of the housing 150 where less ferromagnetic components are positioned. Further, by nature of the first ferromagnetic component 158 being lesser in mass than the second ferromagnetic component 160, the portion of the first incident magnetic field emanating from the medial side of the magnetic block 120 is disproportionally stronger than the portion of the first incident magnetic field emanating from the lateral side 122 of the magnet block 120. This stronger portion of the incident magnetic field (not shown) is directed inward towards the target region 106 of the member 112.

Similarly, the arrangement of components within the second magnetic block 124, i.e., the first ferromagnetic component 178, the second ferromagnetic component 180, and the magnet 176 of the second magnetic block 124, are mirrored in relation to the various components of the first magnetic block 120, as shown in FIG. 3. Given the behavior of a second incident magnetic field (not shown) in the arrangement of the ferromagnetic components 158 and 178 relative to the magnet 176, and by nature of the first ferromagnetic component 178 being lesser in mass than the second ferromagnetic component 180, the portion of the second incident magnetic field emanating from a medial side of the magnet block 124 is disproportionally stronger than the portion of the second incident magnetic field emanating from the lateral side 126 of the magnet block 124. Accordingly, as indicated by the shape of the magnetic field 302 shown, this stronger portion of the second incident magnetic field is similarly directed inward towards the target region 106 of the member 112.

The first ferromagnetic component 158 and the second ferromagnetic component 160 further serve to induce an obliquity of the resulting magnetic field 302. Described in terms of the first magnetic block 120 and illustrated in FIG. 3, the magnet 156 and the first ferromagnetic component 158 may collectively define a first center of gravity 352. Similarly, the second ferromagnetic component 160 may define a second center of gravity 354. In some embodiments, the second center of gravity 354 of the second ferromagnetic component 160 is vertically offset relative to the first center of gravity 352. This is achieved in some embodiments by increasing the length/height of the second ferromagnetic component 160 in the vertical plane such that the second center of gravity 354 of the second ferromagnetic component 160 is located lower in the vertical plane than the first center of gravity 352. This offset of the respective centers of gravity 352 and 354 causes the magnetic field 302 to assume an inwardly-directed and oblique shape. In some embodiments, the obliquity of the incident magnetic field is modified by raising or lowering the second center of gravity 354 relative to the first center of gravity 352 such that a line defined through the second center of gravity 354 and the first center of gravity 352 determines an inward and upward direction of obliquity of the incident magnetic field 302.

Similarly, regarding the second magnetic block 124, the first ferromagnetic component 178 and the second ferromagnetic component 180 induce an obliquity of the resulting magnetic field 302. The magnet 176 and the first ferromagnetic component 178 collectively define a first center of gravity 356. The second ferromagnetic component 180 defines a second center of gravity 358. In some embodiments, the second center of gravity 358 of the second ferromagnetic component 180 is vertically offset relative to the first center of gravity 356 of the first ferromagnetic component 178. This is achieved in some embodiments by increasing the length of the second ferromagnetic component 180 in the vertical plane such that the second center of gravity 358 of the second ferromagnetic component 180 is located lower in the vertical plane than the first center of gravity 356 of the first ferromagnetic component 178. This offset of the respective centers of gravity 356 and 358 causes the incident magnetic field 302 to assume an inwardly directed and oblique shape. In some embodiments, the obliquity of the incident magnetic field is modified by raising or lowering the second center of gravity 358 relative to the first center of gravity 356 such that a line defined through the second center of gravity 358 and the first center of gravity 356 determines an inward and upward direction of obliquity of the incident magnetic field.

The first portion 303A of the magnetic field 302 and the second portion 303B of the magnetic field 302 respectively generated by the first magnetic block 120 and the second magnetic block 124 are symmetric about the plane 110. The plane 110 is equidistant from the first magnetic block 120 and the second magnetic block 124. FIG. 3 illustrates the resulting magnetic field 302 defined by the convergence of the first incident magnetic field (first portion 303A) and the second incident magnetic field (second portion 303B). The resulting magnetic field 302 is symmetric about the plane 110 due to the inwardly-directed, opposing and equal forces generated by the first magnetic block 120 and the second magnetic block 124. This opposition of forces causes a convergence of the incident magnetic fields from the first and second magnetic blocks 120 and 124 such that the plane 110 is located equidistantly between them. The result is at least one or more flux vectors of the magnetic field 302 extending parallel to and within the plane 110 defining a location of the center of the member 112.

The flux/force vectors of the magnetic field 302 (e.g. force vector 302A and force vector 302B) extending in a direction aligned with or parallel to the plane 110 are induced by the symmetric repulsion of the like poles (north-north or south-south) of the first magnetic block 120 and the second magnetic block 124. Outside of the plane 110, however, all magnetic field vectors defined by the magnetic field 302, and passing through the barrier 108, with the exception only of those oriented in the opposite polar direction and generally distant from the target region, do not extend in a direction parallel to the plane. The measurement device 104 detects these differences in magnetic flux vectors and provides a positive indication of some kind (e.g., arrow 506 points directly towards the barrier 108) when the measurement device 104 detects portions of the magnetic field 302 extending in a direction aligned with or parallel to the plane 110; and also provides a negative indication of some kind as to absence of the same (e.g., the arrow 506 points away from the target region 106) where no portions of the magnetic field 302 are extending in a direction aligned with or parallel to the plane 110. The measurement device 104 may be urged along the second surface 115B of the barrier 108, and the target region 106 can be mapped or otherwise identified where the measurement device 104 provides the positive indication (e.g., arrow 506 points directly towards the barrier 108) when it detects portions of the magnetic field 302 extending in a direction aligned with or parallel to the plane 110.

Figure 4:
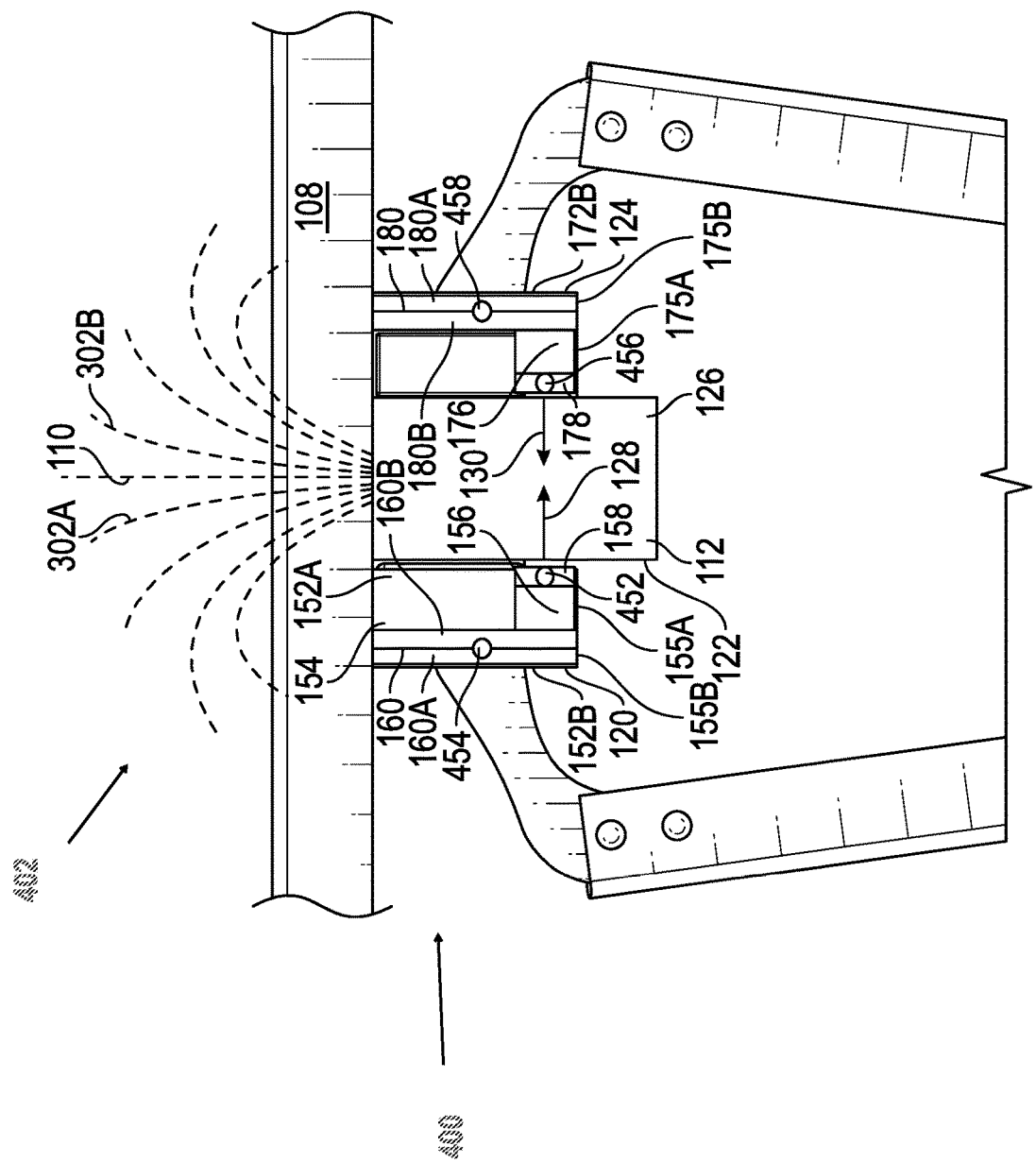
FIG. 4 is an illustration of approximate magnetic flux direction lines of a magnetic field generated by the apparatus described herein utilizing a second configuration of the magnet assembly.

With the first configuration 300 shown in FIG. 3, the barrier 108 has a has a form factor or profile that is increased in size and/or has an increased thickness (relative to configuration 400 of FIG. 4) and/or the magnetic field 302 including its amplification and flux density is more suitable for a given application. For example, where the barrier 108 relates to a thicker roof or thick roof membrane/deck, and the member 112 relates to a rafter or other such structural member, the first configuration 300 and the magnetic field 302 produced may allow the measurement device 104 to more accurately gauge the properties of the magnetic field 302 being produced through the thick roof profile. Conversely, FIG. 4 illustrates a configuration 400 of the magnet assembly 102 generating a magnetic field 402 that may be more suitable for a barrier 108 with a thinner profile or reduced thickness; as in the case where the barrier 108 relates to a thin roof or thin roof membrane/deck, and the member 112 relates to a rafter or other such structural member.

Numerous applications of the apparatus 100 and variations of the features described are contemplated. For example, the ferromagnetic components described herein may comprise steel but may also comprise any other type of ferromagnetic material or element as would be appreciated by those skilled in the art. The placement of magnetically susceptible, or ferromagnetic, materials (such as steel) adjacent to a permanent magnet (e.g., magnet 156) at its poles effectively amplifies the flux density in the magnetic field around the permanent magnet. The placement of unequal quantities of steel on the two poles of a magnet generally results in the formation of a magnetic field with higher flux density emanating from the side with less steel added than from the side with more steel added. In some embodiments, the sides of the two magnets (e.g., magnet 156 and magnet 176) that face one another (the "insides") are faced with a single steel bar (e.g., ferromagnetic components 158 and 178) 0.125" thick with other dimensions being the same as the large side of the magnet next to which it is positioned. The "outsides" (e.g., ferromagnetic components 160 and 180) may comprise a steel "washer" and may include a keyhole formed therein, each being 0.125" thick and larger than the single steel bar, but with machined holes. While a precise proportion of steel on the two sides of each magnet is not relevantly attainable in light of the irregularities of shape, orientation and distance from the magnet, experimental work revealed that proportions in the range 2:1-8:1 of ferromagnetic materials in front of and behind (respectively) the magnets optimized the amplification of flux density under a variety of operating conditions.

Figure 6:
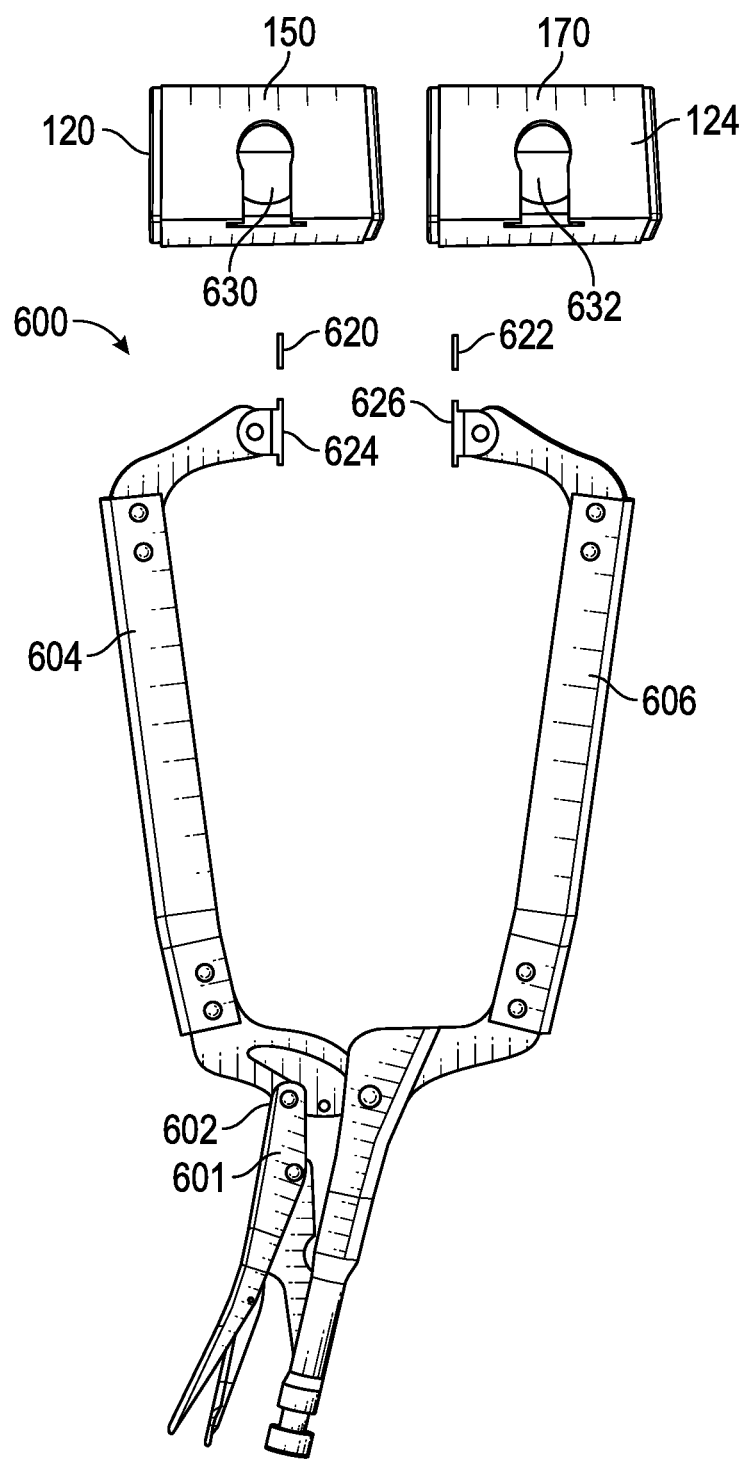
FIG. 6 illustrates a modification of a clamp and features of the magnet assembly which accommodate engagement with the clamp according to embodiments described herein.
Figure 7:
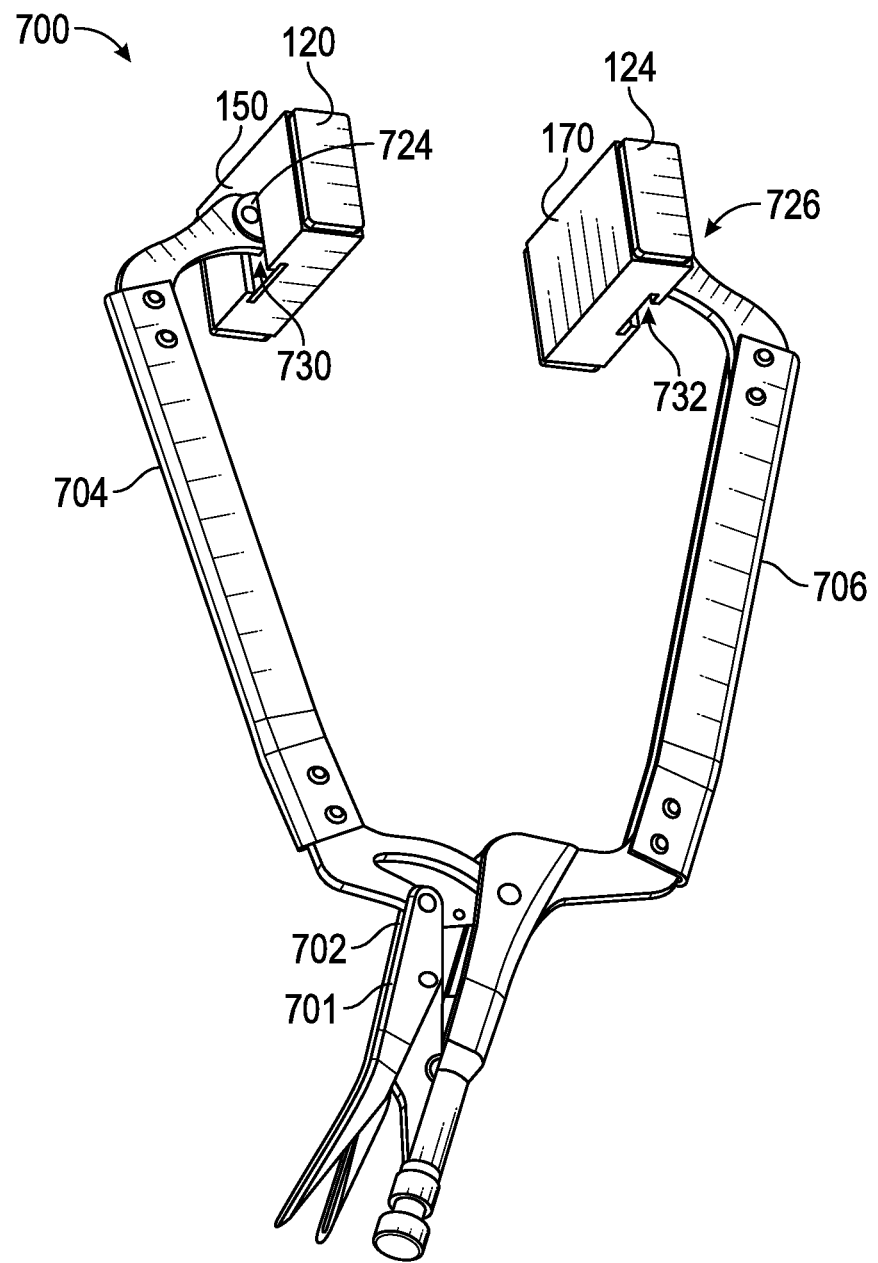
FIG. 7 is a perspective view of the apparatus of FIG. 1A where slots coupling the magnetic blocks to the clamp are oriented in a first configuration.
Figure 8:
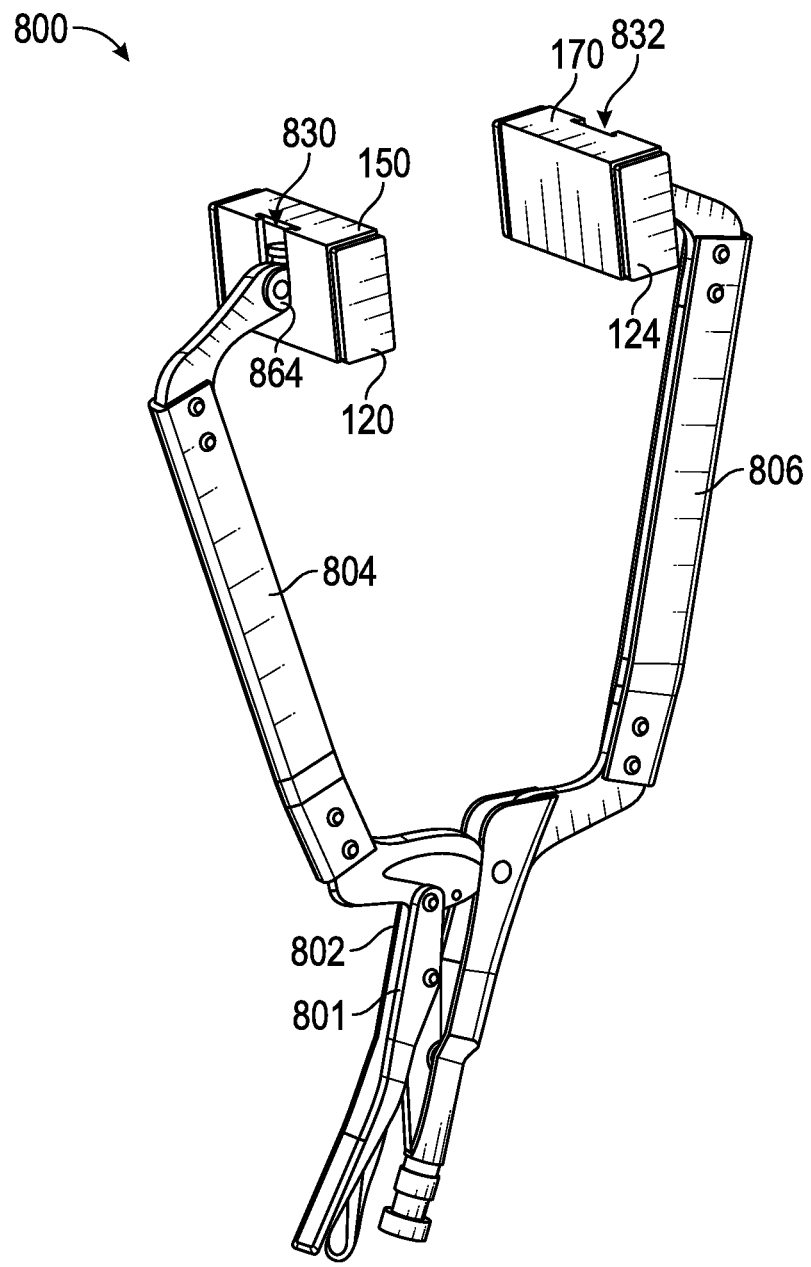
FIG. 8 is a perspective view of the apparatus of FIG. 1A where slots coupling the magnetic blocks to the clamp are oriented in a second configuration.

The specific arrangement of ferromagnetic materials in relation to a magnet within each magnet housing results in the formation of a symmetrical field in which the magnetic flux density emanating from the interior sides of the magnet blocks is significantly greater than that emanating from the opposite sides (that may include an opening to receive clamp pressure pads as shown in FIG. 2 and FIG. 6. This flux density differential is represented in FIG. 3 and FIG. 4.

When used for rafter center location, and employing the configuration 400 of the magnet assembly 102, the magnetic field 402 is optimized for finding a rafter center for barriers with thickness less than approximately 2". Conversely, employing the configuration 300 of FIG. 3, the magnetic field 302 is optimized for finding rafter center for barriers with thickness greater than approximately 2". The benefit in the former case is that the magnetic flux direction (as measured, for example, by a compass needle on the second side 116 of the barrier 108) changes more rapidly with slight lateral movement away from the plane 110 that includes the rafter center than it would in the magnetic field in the higher flux density configuration of FIG. 4. The benefit in the latter case, as may be found, for example, on a roof with 2-4" of foam insulation between the roof deck and the roof surface, is that the magnetic field produced—even at distances greater than 5" from the magnetic field source—is of sufficiently higher flux density than that of ambient magnetic fields that are likely to be present (such as that of the earth as measured on earth's surface), as to render the ambient fields' impact on overall magnetic flux direction at that measuring location insignificant. In the FIG. 3 configuration, however, at distances approaching 3.5-5" from the magnet blocks, earth's magnetic field would have a significant bearing on overall magnetic flux direction. The present disclosure contemplates embodiments capable of overcoming this limitation. For example, means of reading a magnetic field including any of a class of widely available magnetometers capable of being calibrated to disregard ambient magnetic field vectors. The presence or absence of specific characteristics in descriptions of a given embodiment should not be construed as having a limiting effect on the validity of any particular claim or other embodiments.

In one embodiment, the magnets 156 and 176 may be grade N52 permanent magnets, of approximate dimensions 60 mm×20 mm×10 mm (2.3"×0.75"×0.38"), with poles of the magnets 156 and 176 being oriented towards one another on their largest faces. In other words, during use, the magnets 156 and 176 are oriented with like poles facing one another. In general, each of the housing 150 and the housing 170 is non-ferromagnetic.

Measurement Device

Figure 5:
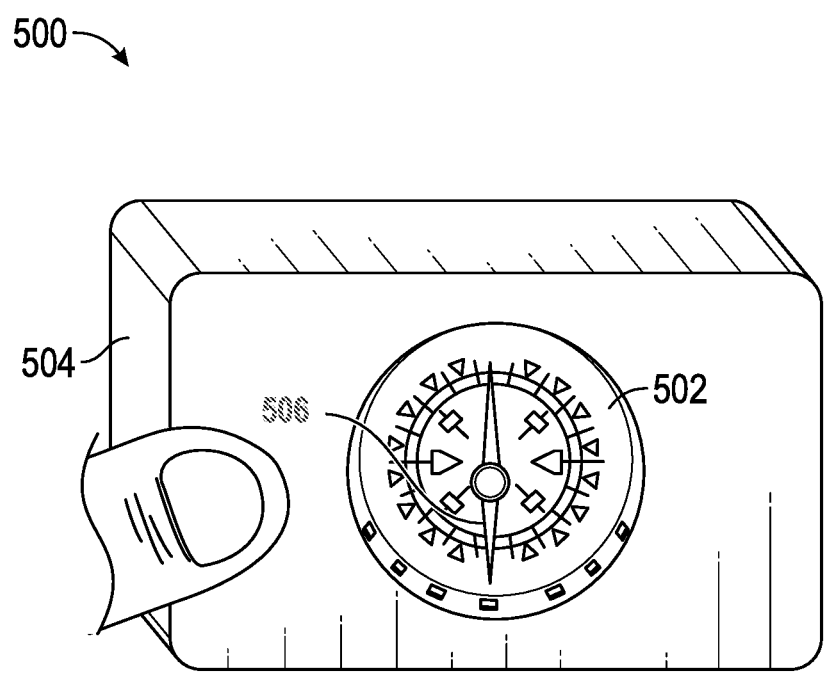
FIG. 5 is an illustration of a possible measurement device for the apparatus of FIG. 1A or apparatus of FIG. 1C.

Referring to FIG. 5, one embodiment of the measurement device 104 is shown. In this embodiment, the measurement device 104 takes the form of a compass block 500 comprised of a compass 502 set within a compass body 504 to facilitate the identification of the target region 106 along the barrier 108. In use, the compass block 500 may be held in a near-perpendicular orientation along the second surface 115B and the second side 116 of the barrier 108. The compass block 500 may be made of any suitable, durable, non-ferromagnetic material. Subsequent to deployment of the magnetic assembly 102, the compass block 500 may be oriented such that an engagement surface 505 of the compass block 500 is oriented towards the second surface 115B of the barrier 108. The compass block 500 may then be moved laterally over the second surface 115B of the barrier 108 until an arrow 506 of the compass 502 points directly towards the barrier 108, indicating detection of the target region 106 along the second surface 115B of the barrier 108 corresponding to the plane 110. In this manner, the plane 110 relates to a center of the member 112 and generally includes a line in which the compass's arrow 506 (which in traditional compass use points to magnetic north) consistently points directly downward towards the barrier 108 (when like magnetic poles 128 and 130 are north magnetic poles). In some embodiments, the compass block 500 may further include a baseplate with a slot to assist with marking target locations along the second surface 115B of the barrier 108.

Clamp

Referring to FIG. 6, one embodiment of the clamp 140 is shown, designated clamp 600. In this embodiment, the clamp 600 may include a modified vise grip device, such as a modified "Vise Grip 18SP" (selected for its deep and wide throat) but the present disclosure is not limited in this regard. In general, the clamp 600 includes defines a clamp body 601 including a base 602, a first jaw 604 extending from the base 602, and a second jaw 606 extending from the base 602 with the second jaw 606 in parallel arrangement relative to the first jaw 604 as shown. In general, the first jaw 604 may be removably coupled to the first magnetic block 120 of the magnet assembly 102, the second jaw 606 may be removably coupled to the second magnetic block 124 of the magnet assembly 102, and the clamp 600 may be actuated to position and maintain the first magnetic block 120 and the second magnetic block 124 in the configuration shown in FIG. 1A relative to the member 112. The jaws (604 and 606) of the clamp 600 (with the magnet blocks 120 and 124) attached are of sufficient depth to allow the magnet blocks to be pressed against both sides of the member 112 and against the barrier 108.

In addition, the clamp 600 includes a first pressure pad 620 coupled to a terminal end 624 of the first jaw 604, and a second pressure pad 622 coupled to a terminal end 626626 of the second jaw 606. In some embodiments, a strip of compressible material (such as silicone rubber), about 0.67"×0.25"×0.125", is placed between each pressure pad (620 and 622) and the clamp body 601 to reduce the degree of freedom of swivel movement of the pressure pads, thus stabilizing the magnet blocks to facilitate their positioning on a structural member such as a rafter and against a planar member such as the bottom of a roof deck. The degree of freedom of swivel movement of the pressure pads (620 and 622) of the clamp 600 is restricted by the compressible material between each pressure pad and the clamp body.

As further shown, the housing 150 of the first magnetic block 120 may include an opening 630, and the housing 170 of the second magnetic block 124 may include an opening 632. The opening 630 and the opening 632 facilitate attachment to the first pressure pad 620 and the second pressure pad 622, respectively.

In some embodiments, each of the ferromagnetic component 160 and the ferromagnetic opening 180 may include respective openings (shown for the ferromagnetic component 160 in FIG. 2) formed therein. These openings may align with the opening 630 and the opening 632, and in combination, allow reception of the clamp pressure pads (620 and 622) only while corresponding magnet housing is in an orientation that is rotated 90 degrees relative to common orientations when the apparatus 100 is in use. Once the pressure pad (e.g., 620) has entered to its operational position in the center of the magnet housing (150), a magnetic force pulls the pressure pad (620) through the opening 630 and the openings within the ferromagnetic component 160 and snugly against the magnet 156, such that the housing 150 may be rotated freely on the pressure pad 620 by the user.

It should be understood from the foregoing that, while particular embodiments have been illustrated and described, various modifications can be made thereto without departing from the spirit and scope of the invention as will be apparent to those skilled in the art. Such changes and modifications are within the scope and teachings of this invention as defined in the claims appended hereto.

What is claimed is:

1. An apparatus for identifying a plane defined by a member through an occluding barrier, comprising:
   a magnet assembly that generates a magnetic field, the magnet assembly positioned along a predetermined location of a member, the member being positioned over a first side of a barrier, the magnet assembly including
      a first magnetic block positioned over a first lateral side of the member adjacent the first side of the barrier, and
      a second magnetic block positioned over a second lateral side of the member opposite the first lateral side; and
   a measurement device positioned over a second side of the barrier opposite the first side of the barrier where the measurement device identifies a target region along a surface of the barrier by detecting a presence of at least one force vector of a plurality of force vectors of the magnetic field extending from the member through the barrier in a direction that is parallel to a plane defined through the member, the plane defined equidistantly between the first lateral side and the second lateral side of the member and extending in transverse relation relative to the barrier.

2. The apparatus of claim 1, wherein the first magnetic block and the second magnetic block symmetrically are counterposed along the member, and the first magnetic block defines a first magnetic pole and the second magnetic block defines a second magnetic pole oriented towards the first magnetic pole such that the magnetic field is symmetrical about a center of the member.

3. The apparatus of claim 2, wherein the first magnetic block and the second magnetic block are nominally equal in strength, and wherein the first magnetic pole and the second magnetic pole are of like polarity.

4. The apparatus of claim 3, wherein the measurement device indicates the target region as a portion of the surface where any of the plurality of force vectors of the magnetic field extend in the direction parallel to the plane.

5. The apparatus of claim 1, wherein a distance from the plane to the first magnetic block is equidistant to a distance from the plane to the second magnetic block.

6. The apparatus of claim 1, wherein the plane extends through a center of the member over the target region along the second side of the barrier.

7. The apparatus of claim 1, further comprising:
   a first housing defined by the first magnetic block, the first housing of the first magnetic block including:
      a first chamber defined within the first housing,
      a first magnet occupying a first portion of the first chamber along a first side of the first housing,
      a first ferromagnetic component positioned between the first side of the first housing and the first magnet, and
      a second ferromagnetic component occupying a second portion of the first chamber along a second side of the first housing opposite the first side of the first housing such that the first magnet is positioned between the second ferromagnetic component and the first ferromagnetic component.

8. The apparatus of claim 7, wherein the second ferromagnetic component is greater in mass than the first ferromagnetic component and the first magnet.

9. The apparatus of claim 7, wherein a first center of gravity defined by the first ferromagnetic component is offset from a second center of gravity defined by the second ferromagnetic component, such that the first magnetic block contributes to a greater flux density of the magnetic field emanating in an oblique direction characterized by a line through the second center of gravity defined by the second ferromagnetic component and the first center of gravity defined by the first ferromagnetic component.

10. The apparatus of claim 7, wherein the first ferromagnetic component and the second ferromagnetic component are positioned directly adjacent to the first magnet and increase magnetic field strength proximate to the plane.

11. The apparatus of claim 7, wherein a proportion of mass and magnetic susceptibility of the second ferromagnetic component relative to the first ferromagnetic component is in a range of 2:1 to 8:1.

12. The apparatus of claim 7, further comprising:
   a second housing defined by the second magnetic block, the second housing of the second magnetic block including:
      a second chamber defined within the second housing,
      a second magnet occupying a first portion of the second chamber along a first side of the second housing,
      a first ferromagnetic component positioned between the first side of the second housing and the second magnet, and
      a second ferromagnetic component occupying a second portion of the second chamber along a second side of the second housing opposite the first side of the second housing such that the second magnet is positioned between the second ferromagnetic component and the first ferromagnetic component of the second housing.

13. The apparatus of claim 1, further comprising:
   a clamp that maintains the first magnetic block and the second magnetic block of the magnet assembly in a fixed position relative to the member.

14. A method for detecting a member on an opposite side of a barrier, comprising:
   positioning a magnet assembly along a predetermined location of a member over a first side of a barrier;
   generating, by opposing magnetic forces of the magnet assembly, a magnetic field with a plurality of forces extending in different directions through the member; and
   detecting, by a measurement device positioned over a second side of the barrier opposite the first side, a presence of at least one of the plurality of forces extending in a direction parallel to or within a plane defined between lateral sides of the member.

15. The method of claim 14, further comprising:
   mapping a target region as a plurality of locations along a surface of the second side of the barrier where the measurement device detects any presence of a force of the magnetic field extending in the direction parallel to or within the plane.

16. An apparatus, comprising:
   a magnet assembly including a first magnet and a second magnet symmetrically counterposed on opposite sides of a member that each generate magnetic forces and form a magnetic field through a barrier; and
   a measurement device positioned over an opposite side of the barrier relative to the member that provides a positive indication when the measurement device is aligned over a target region of a surface of the barrier and the measurement device detects a presence of a force of the magnetic field extending in a direction parallel to or within a plane defined between lateral sides of the member.

\* \* \* \* \*